(12) United States Patent
Ishikawa

(10) Patent No.: US 11,624,819 B2
(45) Date of Patent: Apr. 11, 2023

(54) SIGNAL PROCESSING DEVICE, RADAR DEVICE AND SIGNAL PROCESSING METHOD

(71) Applicant: DENSO TEN Limited, Kobe (JP)

(72) Inventor: Hiroki Ishikawa, Kobe (JP)

(73) Assignee: DENSO TEN Limited, Kobe (JP)

( * ) Notice: Subject to any disclaimer, the term of this patent is extended or adjusted under 35 U.S.C. 154(b) by 448 days.

(21) Appl. No.: 16/711,666

(22) Filed: Dec. 12, 2019

(65) Prior Publication Data
US 2020/0363522 A1 Nov. 19, 2020

(30) Foreign Application Priority Data

May 13, 2019 (JP) .............................. JP2019-090809

(51) Int. Cl.
*G01S 13/72* (2006.01)
*G01S 7/288* (2006.01)
*H04B 7/0413* (2017.01)

(52) U.S. Cl.
CPC ............ *G01S 13/726* (2013.01); *G01S 7/288* (2013.01); *H04B 7/0413* (2013.01); *G01S 7/2883* (2021.05)

(58) Field of Classification Search
CPC ...... G01S 13/726; G01S 7/288; G01S 7/2883; G01S 13/4418; H04B 7/0413
See application file for complete search history.

(56) References Cited

U.S. PATENT DOCUMENTS

| | | | | |
|---|---|---|---|---|
| 7,053,815 | B1* | 5/2006 | Joynson | G01S 13/723 342/149 |
| 2007/0115169 | A1* | 5/2007 | Kai | G01S 13/931 342/174 |
| 2012/0056773 | A1* | 3/2012 | Sato | G01S 7/354 342/109 |
| 2014/0111372 | A1* | 4/2014 | Wu | G01S 7/021 342/146 |
| 2015/0130655 | A1 | 5/2015 | Aizawa | |
| 2019/0285738 | A1* | 9/2019 | Iwasa | G01S 7/03 |

FOREIGN PATENT DOCUMENTS

JP 2018-136232 A 8/2018

* cited by examiner

*Primary Examiner* — Bernarr E Gregory
(74) *Attorney, Agent, or Firm* — Oliff PLC

(57) ABSTRACT

A signal processing device, includes: an azimuth estimation unit configured to estimate an arrival azimuth of a radio wave based on a reception signal of plural antennas; an estimated reception signal calculation unit configured to calculate an estimated reception signal based on an estimation result of the arrival azimuth, for comparison with the reception signal; a residual signal calculation unit configured to calculate a residual signal which is a difference between the reception signal and the estimated reception signal; and a determination unit configured to determine whether the estimation result of the arrival azimuth is correct based on the residual signal.

8 Claims, 6 Drawing Sheets

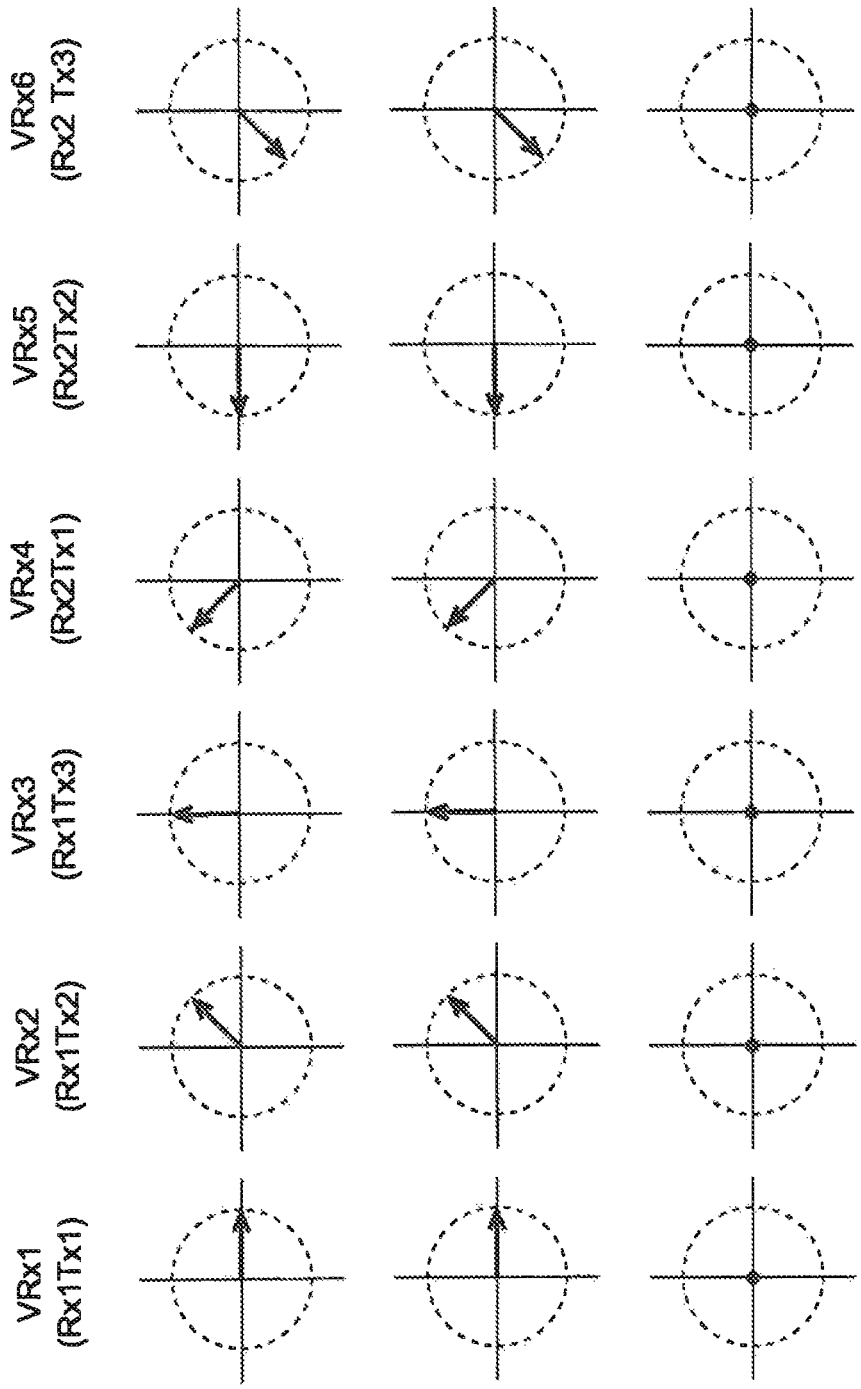

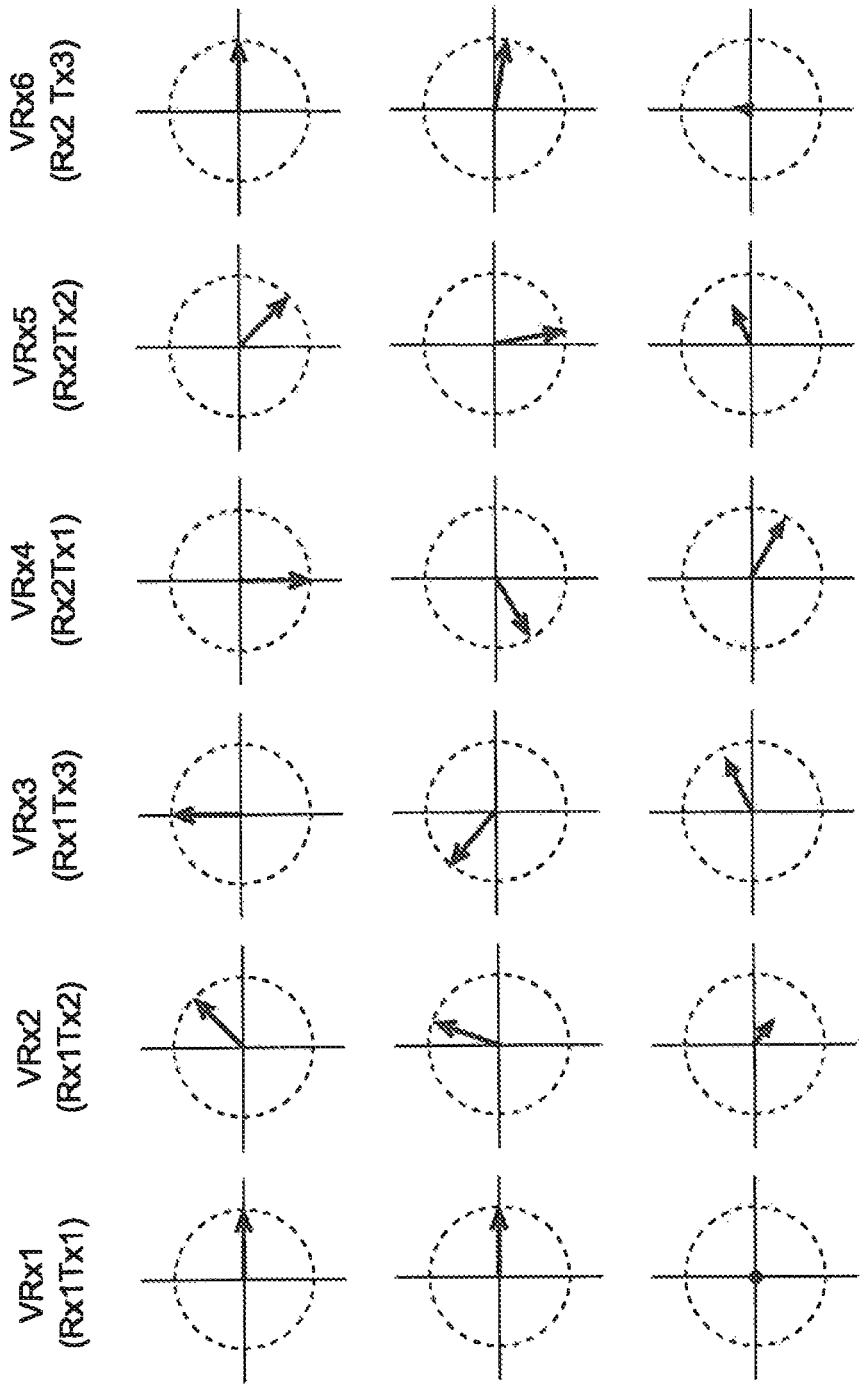

SIGNAL PROCESSING DEVICE, RADAR DEVICE AND SIGNAL PROCESSING METHOD

CROSS-REFERENCE TO RELATED APPLICATIONS

This application is based upon and claims the benefit of priority from prior Japanese patent application No. 2019-090809, filed on May 13, 2019, the entire contents of which are incorporated herein by reference.

BACKGROUND

Technical Field

The present invention relates to a signal processing device, a radar device, and a signal processing method.

Related Art

A radar device transmits a radio wave, and measures a distance, a relative velocity, and an azimuth of a target upon receiving the radio wave reflected from the target. When the distance and the like relating to the target is measured, it is assumed that a path along which the radio wave transmitted from the radar device reaches the target (outward path) matches a path along which the radio wave reflected by the target returns to the radar device (return path). However, radio waves received by the radar device include radio waves whose outward paths and return paths do not match each other, and a target that is not originally present (i.e. a ghost) may be erroneously detected.

A radar device disclosed in JP-A-2018-136232 includes a transmission antenna group, a reception antenna group, a first detection unit, a second detection unit, and an identification unit. The first detection unit detects a signal corresponding to a target based on a radio wave transmitted from a first transmission antenna and received by the reception antenna group. The second detection unit performs transform processing corresponding to a transmission antenna interval on the radio wave transmitted from the first transmission antenna and received by the reception antenna group, and a radio wave transmitted from a second transmission antenna and received by the reception antenna group, and detects a signal corresponding to the target. The identification unit compares detection results obtained by the first detection unit and the second detection unit, and identifies whether the signal corresponding to the target is a real image or a virtual image. Accordingly, even when multipath propagation occurs, it is possible to distinguish between a virtual image and a real image.

SUMMARY

In the method of JP-A-2018-136232, in order to distinguish between the virtual image and the real image, it is necessary to perform radio wave transmission and reception for detection by the first detection unit and radio wave transmission and reception for detection by the second detection unit. A load of the signal processing may increase.

In view of the above circumstances, an object of the present disclosure relates to providing a technology which is capable of reducing erroneous detection of the target while suppressing the processing load increase.

[1] According to an aspect of the present disclosure, there is provided a signal processing device including: an azimuth estimation unit configured to estimate an arrival azimuth of a radio wave based on a reception signal of plural antennas; an estimated reception signal calculation unit configured to calculate an estimated reception signal based on an estimation result of the arrival azimuth, for comparison with the reception signal; a residual signal calculation unit configured to calculate a residual signal which is a difference between the reception signal and the estimated reception signal; and a determination unit configured to determine whether the estimation result of the arrival azimuth is correct based on the residual signal.

[2] In the signal processing device according to [1], the determination unit may determine whether the estimation result of the arrival azimuth is correct by comparing a power value calculated based on the reception signal with a residual power calculated from the residual signal.

[3] In the signal processing device according to [2], the power value may be an azimuth power calculated based on a complex amplitude of the radio wave coming from the estimated arrival azimuth.

[4] In the signal processing device according to [2], the power value may be a power value derived based on a power spectrum obtained by performing Fourier transform on the reception signal.

[5] In the signal processing device according to any one of [1] to [4], the plural antennas may be plural virtual antennas based on a combination of plural transmission antennas and plural reception antennas.

[6] According to another aspect of the present disclosure, there is provided a radar device including: the signal processing device according to any one of [1] to [5]; and the plural antennas configured to acquire the reception signal.

[7] According to another aspect of the present disclosure, there is provided a signal processing method including: estimating an arrival azimuth of a radio wave based on a reception signal of plural antennas; calculating an estimated reception signal based on an estimation result of the arrival azimuth, for comparison with the reception signal; calculating a residual signal which is a difference between the reception signal and the estimated reception signal; and determining whether the estimation result of the arrival azimuth is correct based on the residual signal.

According to the present disclosure, the erroneous detection of the target may be reduced while the processing load increase is suppressed.

BRIEF DESCRIPTION OF DRAWINGS

Exemplary embodiment(s) of the present invention will be described in detail based on the following figures, wherein:

FIGS. 4A, 4B, and 4C illustrate a function of a correctness determination unit according to the exemplary embodiment;

FIGS. 5A, 5B, and 5C illustrate the function of the correctness determination unit;

DETAILED DESCRIPTION

Hereinafter, an exemplary embodiment of the present invention will be described in detail with reference to the drawings.

<1. Configuration of Radar Device>

Figure 1:
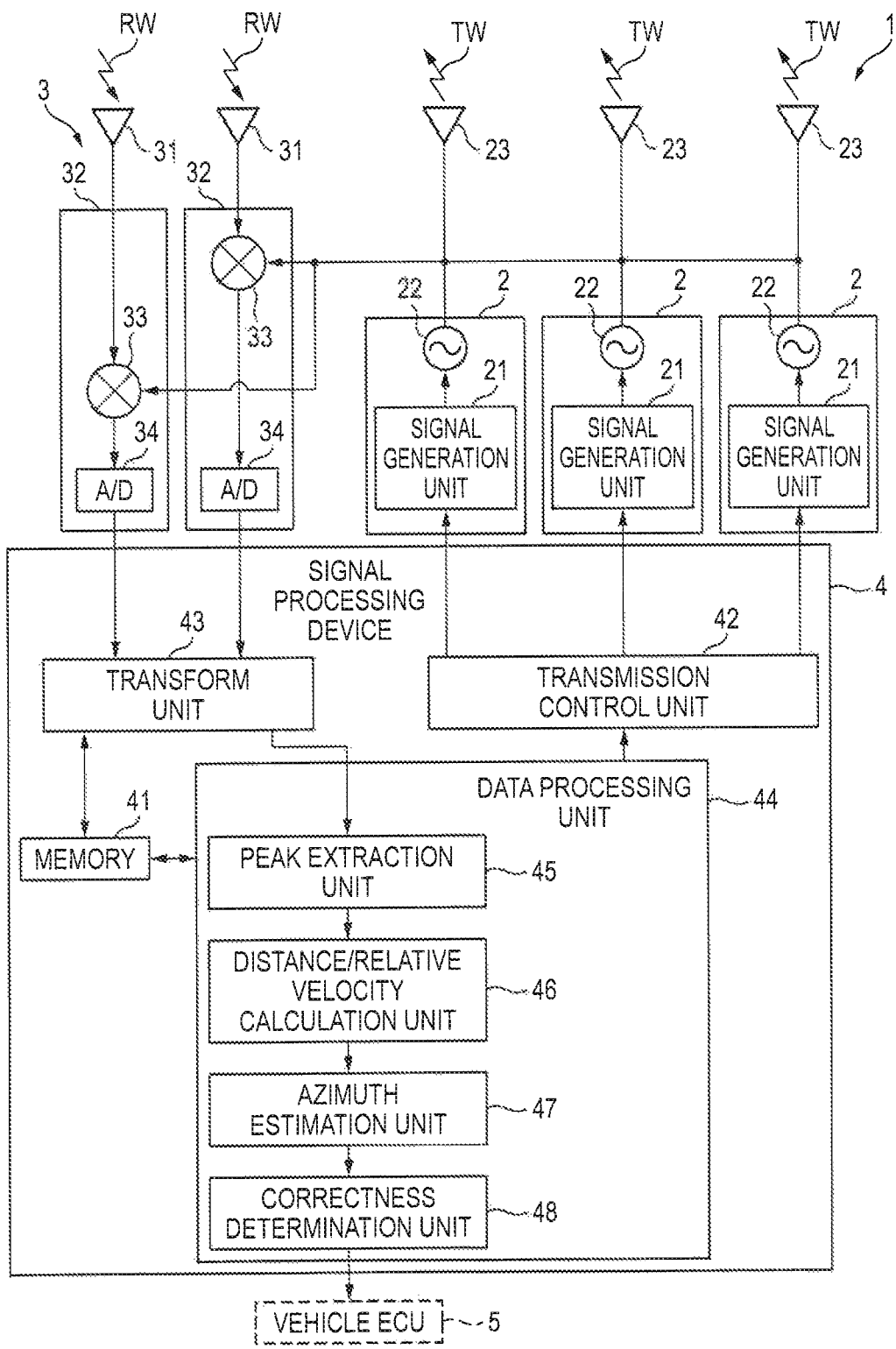
FIG. 1 shows a configuration of a radar device according to an exemplary embodiment.

FIG. 1 shows a configuration of a radar device 1 according to an embodiment of the present invention. The radar device 1 may be mounted on a moving body, such as a vehicle, a robot, an aircraft, or a watercraft. In the present embodiment, the radar device 1 is placed on a vehicle, such as an automobile. Hereinafter, the vehicle on which the radar device 1 is placed is referred to as the given vehicle.

The radar device 1 is used to detect targets around a given vehicle on which the radar device 1 is mounted, such as other vehicles, road signs, guardrails, and people. A detection result of a target is output to a storage device of the given vehicle or a vehicle electronic control unit (ECU) 5 that controls behaviors of the given vehicle. The detection result of the target is used in vehicle control, such as, for example, a pre-crash safety system (PCS) or an advanced emergency braking system (AEBS).

As shown in FIG. 1, the radar device 1 includes plural transmission units 2, a reception unit 3, and a signal processing device 4. In the present embodiment, the radar device 1 is preferably a so-called multiple-input and multiple-output (MIMO) radar device. The radar device 1 is preferably a radar device of fast-chirp modulation (FCM) type that transmits chirp waves whose frequency continuously increase or decrease, and detects distance and relative velocity of each target within a detection range.

The transmission unit 2 includes a signal generation unit 21 and an oscillator 22. The signal generation unit 21 generates a modulation signal whose voltage changes in a saw tooth waveform, and supplies the modulation signal to the oscillator 22. The oscillator 22 generates a transmission signal which is a chirp signal based on the modulation signal generated by the signal generation unit 21, and outputs the transmission signal to a transmission antenna 23.

The radar device 1 includes plural transmission antennas 23. In the present embodiment, the number of the transmission antennas 23 is three. The number of the transmission units 2 is also three in accordance with the number of the transmission antennas 23. However, the number of the transmission antennas 23 may be a plural number other than three. The number of the transmission units 2 may also be changed according to the number of the transmission antennas 23. The number of the transmission antennas 23 and the number of the transmission units 2 may not always match each other. For example, one transmission unit 2 may be provided for three transmission antennas 23, and connection between each transmission antenna 23 and the transmission units 2 may be switched by a switch.

Each of the three transmission antennas 23 receives the transmission signal from a different transmission unit 2, transforms the transmission signal into a transmission wave TW, and outputs the transmission wave TW. The transmission signals output from the three transmission units 2 are signals orthogonal to each other (orthogonal signals). To be orthogonal means that the signals do not interfere with each other, for example, due to differences in time, phase, frequency, code, and the like.

The reception unit 3 includes plural reception antennas 31 and plural individual reception units 32. That is, the radar device 1 includes plural antennas 31 which acquire reception signals. One individual reception unit 32 is connected to each reception antenna 31. Each reception antenna 31 receives a reflected wave RW from a target, acquires a reception signal, and outputs the reception signal to each individual reception unit 32. In the present embodiment, the reception unit 3 includes two reception antennas 31 and two individual reception units 32. However, the number of the reception antennas 31 may be any number other than two as long as the number is a plural number. The number of the individual reception units 32 may be smaller than the number of the reception antennas 31 by employing a switch.

Each individual reception unit 32 processes the reception signal obtained by the corresponding reception antenna 31. The individual reception unit 32 includes a mixer 33 and an A/D converter 34. The reception signal obtained by the reception antenna 31 is amplified by a low noise amplifier (not shown) and then sent to the mixer 33. The transmission signal from each oscillator 22 of each transmission unit 2 is input to the mixer 33, and each transmission signal and the reception signal are mixed in the mixer 33. Accordingly, beat signals, which have beat frequencies, are generated. The beat frequencies are differences between frequencies of each transmission signal and a frequency of the reception signal. The beat signal generated by the mixer 33 is converted into a digital signal by the A/D converter 34 and then output to the signal processing device 4.

The signal processing device 4 performs various types of processing based on each beat signal obtained via each A/D converter 34. The signal processing device 4 includes a microcomputer including a central processing unit (CPU), a memory 41, and the like. The signal processing device 4 stores various data to be calculated in the memory 41, which is a storage device. The memory 41 is, for example, a random access memory (RAM). The signal processing device 4 includes a transmission control unit 42, a transform unit 43, and a data processing unit 44, as functions implemented by software in the microcomputer. The transmission control unit 42 controls the signal generation units 21 of each transmission unit 2.

Since the reception antenna 31 receives the reflected waves from plural targets in an overlapping state, the transform unit 43 performs processing of separating frequency components based on the reflected waves of the targets from the beat signal generated based on the reception signal. In the present embodiment, the transform unit 43 separates the frequency components by fast Fourier transform (FFT) processing. In the FFT processing, reception level and phase information are calculated for each frequency point (may also be referred to as frequency bin) set at a predetermined frequency interval. The transform unit 43 outputs a result of the FFT processing to the data processing unit 44.

Specifically, the transform unit 43 performs two-dimensional FFT processing on the beat signals output from each A/D converter 34. By performing a first FFT processing, a frequency spectrum in which a peak appears in a frequency bin corresponding to the distance to the target (hereinafter also referred to as a distance bin) is obtained. By arranging the frequency spectrum obtained by the first FFT processing in time series and performing a second FFT processing, a frequency spectrum in which a peak appears in a frequency bin with respect to Doppler frequency is obtained (hereinafter also referred to as "velocity bin"). The transform unit 43 obtains a two-dimensional power spectrum, in which the distance bin and the velocity bin serve as axes, by a two-dimensional FFT processing.

The data processing unit 44 includes a peak extraction unit 45, a distance/relative velocity calculation unit 46, an azimuth estimation unit 47, and a correctness determination unit 48. That is, the signal processing device 4 includes the azimuth estimation unit 47.

The peak extraction unit 45 extracts a peak from a result of the FFT processing or the like of the transform unit 43. In the present embodiment, the peak extraction unit 45 extracts a peak indicating a power value equal to or greater than a predetermined value based on the two-dimensional power spectrum, in which the distance bin and the velocity bin serve as the axes, obtained by the two-dimensional FFT processing. In the present embodiment, the peak extraction unit 45 classifies results of the peak extraction into results for each virtual antenna. The virtual antenna is generated by a combination of plural the transmission antennas 23 and plural the reception antennas 31. The virtual antenna will be described below.

The distance/relative velocity calculation unit 46 derives the distance and relative velocity with respect to the target based on a combination of a distance bin and a velocity bin specified by the peak extraction unit 45 as having peaks.

The azimuth estimation unit 47 estimates an arrival azimuth of a radio wave based on reception signals of plural antennas. In the present embodiment, the plural antennas are plural virtual antennas generated by combination of the plural transmission antennas 23 and the plural reception antennas 31. Accordingly, virtual antennas exceeding the number of reception antennas 31 are obtained, and accuracy of azimuth estimation may be improved while preventing an increase in the number of antenna elements.

The azimuth estimation unit 47 focuses on peaks of the same frequency bin extracted by the peak extraction unit 45 for each virtual antenna, and estimates an azimuth in which the target exists based on phase information of the peaks. When there are plural peaks having different frequency bins, the azimuth estimation unit 47 performs azimuth estimation for each peak. Known methods are used for the azimuth estimation, such as multiple signal classification (MUSIC) and estimation of signal parameters via rotational invariance techniques (ESPRIT).

The correctness determination unit 48 determines whether the estimation result of the arrival azimuth of the azimuth estimation unit 47 for each peak is correct. Here, in a case where the estimation result of the arrival azimuth is correct, it means that the target is in the estimated azimuth. In a case where the estimation result of the arrival azimuth is wrong, it means that the target is not in the estimated azimuth (i.e. a ghost is detected). The correctness determination unit 48 will be described in more detail below.

Target data including the distance to the target, the relative velocity of the target, and the azimuth in which the target is present, obtained by the distance/relative velocity calculation unit 46 and the azimuth estimation unit 47, is output to the vehicle ECU 5.

<2. Virtual Antenna>

Figure 2A:
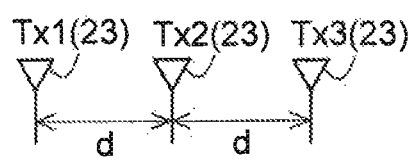
FIGS. 2A, 2B, and 2C show antennas included in the radar device.
Figure 2B:
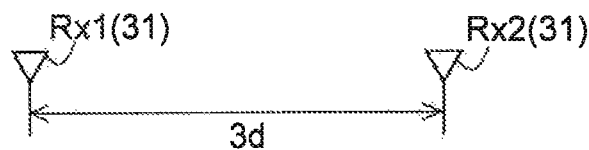
Figure 2C:
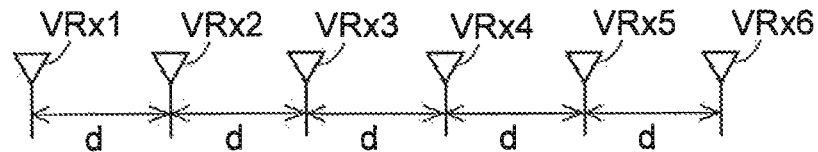

FIGS. 2A, 2B and 2C show antennas included in the radar device 1 according to the embodiment of the present invention.

In the present embodiment, as shown in FIG. 2A, three transmission antennas 23 are arranged at the same antenna interval d along a horizontal direction. As shown in FIG. 2B, two reception antennas 31 are arranged at an antenna interval 3d along the horizontal direction. The antenna interval between adjacent transmission antennas 23 may not be exactly the same in plural sets (two sets of three transmission antennas 23), and is acceptable as long as the intervals can be regarded as being the same in the plural sets when taking design errors, variations, and the like into consideration. The antenna interval between two adjacent reception antennas 31 may not be exactly three times the antenna interval between the two adjacent transmission antennas 23, and is acceptable as long as the interval can be regarded as being three times the antenna interval between the two adjacent transmission antennas 23 when taking design errors, variations, and the like into consideration.

A virtual array antenna shown in FIG. 2C is generated by a combination of the three transmission antennas 23 shown in FIG. 2A and the two reception antennas 31 shown in FIG. 2B. The virtual array antenna shown in FIG. 2C includes six virtual antennas VRx1 to VRx6. The six virtual antennas VRx1 to VRx6 are arranged at the same antenna interval d along the horizontal direction.

Specifically, the first virtual antenna VRx1 is generated by a combination of a first transmission antenna Tx1 and a first reception antenna Rx1. A second virtual antenna VRx2 is generated by a combination of a second transmission antenna Tx2 and the first reception antenna Rx1. A third virtual antenna VRx3 is generated by a combination of a third transmission antenna Tx3 and the first reception antenna Rx1. A fourth virtual antenna VRx4 is generated by a combination of the first transmission antenna Tx1 and a second reception antenna Rx2. A fifth virtual antenna VRx5 is generated by a combination of the second transmission antenna Tx2 and the second reception antenna Rx2. A sixth virtual antenna VRx6 is generated by a combination of the third transmission antenna Tx3 and the second reception antenna Rx2.

That is, a reception signal of the first reception antenna Rx1 includes a reception signal of the first virtual antenna VRx1, a reception signal of the second virtual antenna VRx2, and a reception signal of the third virtual antenna VRx3, which are orthogonal to each other. A reception signal of the second reception antenna Rx2 includes a reception signal of the fourth virtual antenna VRx4, a reception signal of the fifth virtual antenna VRx5, and a reception signal of the sixth virtual antenna VRx6, which are orthogonal to each other.

<3. Correctness Determination of Azimuth Estimation Result>

Figure 3A:
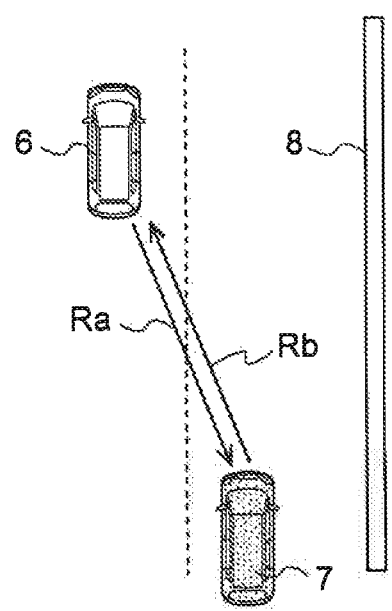
FIGS. 3A and 3B illustrate match and mismatch between an outward path and a return path.
Figure 3B:
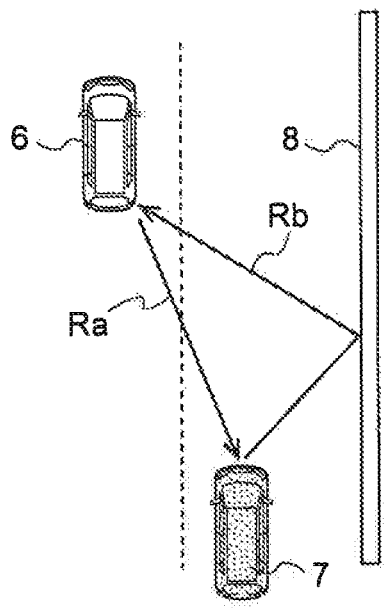

FIGS. 3A and 3B shows match and mismatch between an outward path and a return path. In FIGS. 3A and 3B, a front vehicle 6 is the given vehicle, and a rear vehicle 7 is the target detected by the radar device 1. In FIGS. 3A and 3B, reference numeral 8 denotes a guardrail. The outward path is a path through which the transmission wave TW transmitted from the transmission antenna 23 reaches the target (the vehicle 7 in FIGS. 3A and 3B). The return path is a path through which the reflected wave RW reflected by the target (the vehicle 7 in FIGS. 3A and 3B) reaches the reception antenna 31. A state in which the outward path and the return path match each other not only refers to a state in which the outward path and the return path match each other perfectly, but may also include a state in which the outward path and the return path are considered as matching each other when taking variations and the like into consideration.

In FIG. 3A, an outward path Ra through which the transmission wave TW transmitted from the transmission antenna 23 of the given vehicle 6 reaches the other vehicle 7 and a return path Rb through which the reflected wave RW reflected by the other vehicle 7 reaches the reception antenna 31 of the given vehicle 6 match with each other. In the radar device 1, the target data is obtained on an assumption that the outward path Ra and the return path Rb match each other.

In FIG. 3B, similarly to FIG. 3A, the transmission wave TW transmitted from the transmission antenna 23 of the given vehicle 6 reaches the other vehicle 7 at first (the path Ra indicated by a solid line). Meanwhile, the reflected wave RW reflected by the other vehicle 7 reaches the reception antenna 31 of the given vehicle 6 after being reflected by the guardrail 8 (the path Rb indicated by a solid line). That is, the reflected wave RW reaches the reception antenna 31 via the path (return path) Rb which is different from the outward path Ra. In FIG. 3B, the outward path Ra and the return path Rb do not match each other.

Some of the reflected waves RW reflected by the other vehicle 7 are received by the reception antenna 31 through the path Rb which does not match the outward path Ra as shown in FIG. 3B. A reception signal of the reflected wave RW passing through the path Rb different from the outward path Ra does not conform with the assumption for the signal processing, and is an unnecessary signal that causes erroneous target data calculation, which needs to be removed. The signal processing device 4 includes the correctness determination unit 48, so that the target can be correctly detected by removing such an unnecessary signal.

As an example in which the outward path Ra and the return path Rb do not match each other, a case where the transmission wave TW transmitted from the transmission antenna 23 of the given vehicle 6 travels in an opposite direction to the reflected wave RW indicated by the solid line in FIG. 3B while the reflected wave RW reflected by the other vehicle 7 travels in an opposite direction to the transmission wave TW indicated by the solid line in FIG. 3B is exemplified.

FIGS. 4A, 4B, 4C, 5A, 5B and 5C show a function of the correctness determination unit 48. FIGS. 4A, 4B and 4C are diagrams of a case where the outward path and the return path match each other. FIGS. 5A, 5B and 5C are diagrams of a case where the outward path and the return path do not match each other. In signal vector diagrams shown in FIGS. 4A, 4B, 4C, 5A, 5B and 5C, a horizontal axis is a real axis, and a vertical axis is an imaginary axis. FIGS. 4A and 5A are vector diagrams of reception signals of the virtual antennas VRx1 to VRx6 which have received radio waves (arriving waves) coming from a certain arrival azimuth. FIGS. 4B and 5B are vector diagrams of estimated reception signals of the virtual antennas VRx1 to VRx6. FIGS. 4C and 5C are vector diagrams of residual signals of the virtual antennas VRx1 to VRx6. In FIGS. 4A, 4B, 4C, 5A, 5B and 5C, magnitudes of the reception signals and the estimated reception signals are assumed to be the same magnitude for convenience of description.

First, FIGS. 4A, 4B and 4C will be described. In FIGS. 4A, 4B and 4C, the outward path and the return path match with each other. Therefore, as shown in FIG. 4A, with reference to the first virtual antenna VRx1, phases of the reception signals received by the virtual antennas VRx2 to VRx6 regularly changes in accordance with an inter-antenna distances between the virtual antennas VRx2 to VRx6 and the first virtual antenna VRx1. In the example shown in FIG. 4A, the phase of the reception signal of the first virtual antenna VRx1 is 0°, the phase of the reception signal of the second virtual antenna VRx2 is 45°, the phase of the reception signal of the third virtual antenna VRx3 is 90°, the phase of the reception signal of the fourth virtual antenna VRx4 is 135°, the phase of the reception signal of the fifth virtual antenna VRx5 is 180°, and the phase of the reception signal of the sixth virtual antenna VRx6 is 225°. That is, the phases change by 45°.

The estimated reception signals shown in FIG. 4B are signals calculated based on the estimation result of the arrival azimuth estimated by the azimuth estimation unit 47 based on the reception signals shown in FIG. 4A. A method of calculating the estimated reception signal will be described in detail below. In the example shown in FIGS. 4A, 4B and 4C, the arrival azimuth is estimated based on a correct arriving wave that satisfies the assumption of MIMO that the outward path and the return path match each other. For this reason, the estimation result of the arrival azimuth is usually a correct result. As a result, the estimated reception signals of the virtual antennas VRx1 to VRx6 calculated based on the estimation result of the arrival azimuth are the same vectors as the reception signals shown in FIG. 4A, as shown in FIG. 4B.

The residual signals shown in FIG. 4C are signals indicating differences between the reception signals shown in FIG. 4A and the estimated reception signals shown in FIG. 4B. FIG. 4C shows results of subtracting the estimated reception signals shown in FIG. 4B from the reception signals shown in FIG. 4A for each of the virtual antennas VRx1 to VRx6. In FIGS. 4A, 4B and 4C, since the estimation result of the arrival azimuth of the azimuth estimation unit 47 is a correct result, there is no difference between the reception signals and the estimated reception signals, and the residual signals are zero. Even if the estimation result of the arrival azimuth is correct, the residual signal may not be completely zero due to presence of noise. Here, it is assumed that there is no noise for the sake of easy understanding.

Next, FIGS. 5A, 5B and 5C will be described. In FIG. 5A, the phase of the reception signal of the first virtual antenna VRx1 is 0°, the phase of the reception signal of the second virtual antenna VRx2 is 45°, and the phase of the reception signal of the third virtual antenna VRx3 is 90°. That is, similarly to FIG. 4A, the phases of the reception signals of the first virtual antenna VRx1, the second virtual antenna VRx2, and the third virtual antenna VRx3 are changed regularly by 45° according to the inter-antenna distance with reference to the first virtual antenna VRx1.

Meanwhile, the phase of the reception signal of the fourth virtual antenna VRx4 is 270°, which shows a phase change different from the regular phase change of the reception signals of the first virtual antenna VRx1 to the third virtual antenna VRx3. However, the phase of the reception signal of the fifth virtual antenna VRx5 is 315° and the phase of the reception signal of the sixth virtual antenna VRx6 is 0° (360°), thus the phases of the reception signals of the fourth virtual antenna VRx4, the fifth virtual antenna VRx5, and the sixth virtual antenna VRx6 are regularly changed by 45°.

In FIG. 5A, when the reception antennas 31 constituting the virtual antennas VRx1 to VRx6 are in the same set, the same phase change (change by)45° as in FIG. 4A is shown. Meanwhile, when the reception antennas 31 constituting the virtual antennas VRx1 to VRx6 are changed, a phase change different from that in FIG. 4A (180° change) is shown. That is, in the example shown in FIGS. 5A, 5B and 5C, it can be determined that the outward path is the same path as in FIGS. 4A, 4B and 4C, and the return path is a path different from that in FIG. 4. In the example shown in FIGS. 5A, 5B and 5C, for example, in a form shown by the solid line in FIG. 3B, the outward path and the return path do not match each other.

The reception antenna which constitutes the first virtual antenna VRx1, the second virtual antenna VRx2, and the third virtual antenna VRx3 is the first reception antenna Rx1, and the reception antennas 31 constituting the virtual antennas VRx1 to VRx3 are in the same group. The reception antenna which constitutes the fourth virtual antenna VRx4, the fifth virtual antenna VRx5, and the sixth virtual antenna VRx6 is the second reception antenna Rx2, and the reception antennas 31 constituting the virtual antennas VRx4 to VRx6 are in the same group.

When the outward path and the return path do not match each other, the azimuth estimation cannot be correctly performed since the assumption of the MIMO is not satisfied. When the outward path and the return path do not match each other, as shown in FIG. 5A, the phase change shows an irregular change that is not related to the inter-antenna distance. Meanwhile, the azimuth estimation unit 47 performs the azimuth calculation on the assumption that the phases change linearly in accordance with the inter-antenna distance. Therefore, the azimuth estimation unit 47 performs wrong estimation on the arrival azimuth of the radio wave. As a result, there is a difference between the estimated reception signals (see FIG. 5B) of the virtual antennas VRx1 to VRx6 calculated based on the estimation result of the arrival azimuth estimated by the azimuth estimation unit 47 based on the reception signals shown in FIG. 5A and the reception signals of the virtual antennas VRx1 to VRx6 shown in FIG. 5A.

As shown in FIG. 5C, in an arriving wave in which the outward path and the return path do not match with each other, a larger residual signal is shown as compared with a case where the outward path and the return path match with each other (see FIG. 4C). In other words, if the residual signal shows a large value, it can be said that there is a high possibility that the estimation result estimated by the azimuth estimation unit 47 is incorrect. Using this concept, the correctness determination unit 48 determines whether the estimation result of the arrival azimuth of the azimuth estimation unit 47 is correct. The residual signal tends to increase when the estimation result of the arrival azimuth is inappropriate. For this reason, the correctness determination unit 48 can detect a wide range of cases where there is an error in the azimuth estimation of the azimuth estimation unit 47, without being limited to the case where the outward path and the return path do not match each other.

Figure 6:
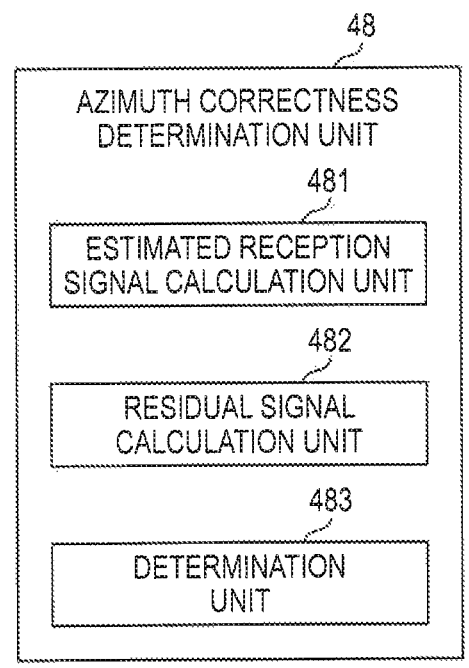
FIG. 6 is a block diagram showing the function of the correctness determination unit.

FIG. 6 is a block diagram showing the function of the correctness determination unit 48 according to the embodiment of the present invention. As shown in FIG. 6, the correctness determination unit 48 includes an estimated reception signal calculation unit 481, a residual signal calculation unit 482, and a determination unit 483. That is, the signal processing device 4 includes the estimated reception signal calculation unit 481 and the determination unit 483. The signal processing device 4 further includes the residual signal calculation unit 482.

The estimated reception signal calculation unit 481 calculates the estimated reception signal based on the estimation result of the arrival azimuth. The estimated reception signal is a signal for comparison with the reception signal. In the present embodiment, the reception signal is obtained from the six virtual antennas VRx1 to VRx6. The estimated reception signal is calculated for each peak when there are plural peaks having different frequency bins. A method of calculating the estimated reception signal will be described in detail below.

The residual signal calculation unit 482 calculates the residual signals which are the difference between the reception signals and the estimated reception signals of the virtual antennas VRx1 to VRx6. Since the residual signal is obtained for each estimated reception signal, it is obtained for each peak in the same manner as the estimated reception signal. A method of calculating the residual signal will be described in detail below.

The determination unit 483 determines whether the estimation result of the arrival azimuth of the azimuth estimation unit 47 is correct based on the reception signals and the estimated reception signals of the virtual antennas VRx1 to VRx6. Specifically, the determination unit 483 determines whether the estimation result of the arrival azimuth of the azimuth estimation unit 47 is correct based on the residual signal. Since the residual signal is obtained for each peak, the determination unit 483 determines whether the estimation result of the arrival azimuth estimated by the azimuth estimation unit 47 is correct for each peak. When plural azimuths are estimated for each peak, the determination unit 483 determines whether the estimation result is correct for each azimuth. A method of determining whether the estimation result of the arrival azimuth is correct based on the residual signal will be described below.

According to the present embodiment, after the azimuth estimation is performed by the azimuth estimation unit 47, whether the estimation result is correct can be confirmed by performing calculation processing using the estimation result of the arrival azimuth. That is, according to the present embodiment, since whether a target which does not exist (ghost) is detected is confirmed, it is not necessary to specially increase the number of times of transmission and reception of the radio wave as in Patent Literature 1, so that erroneous detection of the target object can be prevented while preventing an increase in processing load. In the present embodiment, since the estimation result of the arrival azimuth of the radio wave is used to determine the correctness thereof, errors in the estimation of the arrival azimuth of the radio wave can be widely detected. That is, according to the present embodiment, incorrectness of the estimation result of the arrival azimuth can be detected even when there is an erroneous determination of the arrival azimuth due to phase reflection or an erroneous determination of the arrival azimuth derived from side lobe appearing to overlap the peak, for example, thus the erroneous detection of the target object can be widely prevented.

Figure 7:
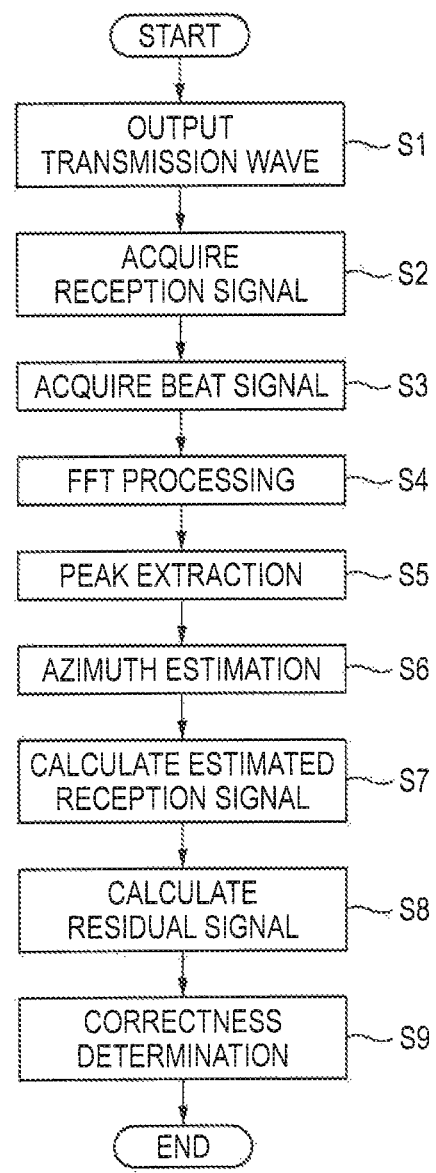
FIG. 7 is a flowchart showing a schematic operation of the radar device.

FIG. 7 is a flowchart showing a schematic operation of the radar device 1 according to the embodiment of the present invention. FIG. 7 mainly shows an operation of determining whether the estimation result of the arrival azimuth estimated by the azimuth estimation unit 47 is correct. That is, in FIG. 7, processing for obtaining the distance to the target and the relative velocity is omitted. The radar device 1 periodically repeats the processing shown in FIG. 7 at regular time intervals.

First, the transmission antenna 23 outputs the transmission wave TW (step S1). Next, the reception antenna 31 receives the reflected wave RW reflected by the target and acquires the reception signal (step S2). Next, the signal processing device 4 acquires a predetermined number of beat signals (step S3). Next, the transform unit 43 performs the FFT processing on the acquired beat signals (step S4).

Next, the peak extraction unit 45 performs peak extraction based on a result of the FFT processing (step S5). The peak extraction unit 45 classifies results of the peak extraction into results for each of the virtual antennas VRx1 to VRx6. The azimuth estimation unit 47 focuses on peaks of the same frequency bin extracted by the peak extraction unit 45 for each of the virtual antennas VRx1 to VRx6, and estimates an azimuth in which the target exists (the arrival azimuth of the radio wave) based on phase information of the peaks (step S6).

Next, the estimated reception signal calculation unit 481 calculates the estimated reception signal for each peak based on a result of the azimuth estimation performed by the azimuth estimation unit 47 (step S7). Before describing a method for calculating the estimated reception signal, a reception signal of a virtual array antenna including plural virtual antennas will be briefly described.

A reception signal vector X(t) of the virtual array antenna (constituted by the plural virtual antennas) at time t can be expressed by the following formula (1):

$$X(t)=AS(t)+N(t) \qquad (1)$$

where S(t) is a complex amplitude vector of the arriving wave; and N(t) is a noise vector.

In formula (1):

$$X(t)=[x_1(t), \ldots, x_M(t)]^T \qquad (2)$$

$$A=[a(\theta_1), \ldots, a(\theta_K)] \qquad (3)$$

$$a(\theta_k)=[1, \exp\{-j\Lambda d \sin(\theta_k)\}, \ldots, \exp\{-j\Lambda(M-1)d \sin(\theta_k)\}]^T \qquad (4)$$

$$\Lambda=2\pi/\lambda \qquad (5)$$

$$S(t)=[s_1(t), \ldots, s_K(t)]^T \qquad (6)$$

$$N(t)=[n_1(t), \ldots, n_M(t)]^T \qquad (7)$$

where $x_m(t)$ represents the reception signal of the m-th virtual antenna; M is the number of the virtual antennas, and equals to 6 in the present embodiment; T represents a transposed matrix; θ is an angle of arrival of the arriving wave; $a(\theta_k)$ is a mode vector; d is a distance between adjacent virtual antennas VRx1 to VRx6; L is the estimated number of arriving waves; and Λ is a wavelength of the arriving wave.

The estimated reception signal calculation unit 481 calculates the complex amplitude vector S(t) according to the following formula (8) assuming that there is no noise vector of the formula (1) when obtaining the estimated reception signal.

$$X(t)=AS(t) \qquad (8)$$

In formula (8), the reception signal vector X(t) is known since the reception signal vector X(t) is the reception signal of the virtual array antenna. The matrix A is known from a result of the azimuth estimation performed by the azimuth estimation unit 47. In formula (8), since the number of unknowns is smaller than the number of equations, there is no solution that can satisfy all equations. For this reason, each complex amplitude $s_k(t)$ is calculated using a least squares method.

The estimated reception signal calculation unit 481 calculates an estimated reception signal vector XE(t) by substituting the obtained complex amplitude vector S(t) into the following formula (9):

$$XE(t)=AS(t) \qquad (9)$$

In formula (9):

$$XE(t)=[xe_1(t), \ldots, xe_M(t)]^T \qquad (10)$$

where $xe_m(t)$ represents the estimated reception signal of the m-th virtual antenna. In the present embodiment, M=6 as described above.

Next, the residual signal calculation unit 482 calculates the residual signal for each peak (step S8). Specifically, the residual signal calculation unit 482 calculates a residual signal vector RE(t) obtained by subtracting the estimated reception signal vector XE(t) from the reception signal vector X(t) for each peak.

Next, the determination unit 483 determines whether the estimation result of each arrival azimuth is correct based on each residual signal (step S9). In the present embodiment, the determination unit 483 determines whether the estimation result of the arrival azimuth is correct by comparing a predetermined power value calculated based on the reception signal with a residual power calculated from the residual signal. Accordingly, correctness determination can be stably performed regardless of fluctuations in magnitudes of the reception signals.

Specifically, the predetermined power value is an azimuth power calculated from the complex amplitude $s_k(t)$ of the radio wave coming from the estimated arrival azimuth. The azimuth power is a value obtained by squaring an absolute value of the complex amplitude $s_k(t)$ obtained by formula (8). When there are plural estimated arrival azimuths at each peak, the number of the azimuth power is also plural.

The residual power is a value obtained by squaring an absolute value of an average value obtained by averaging six elements (complex numbers) constituting the residual signal vector RE(t). In the present embodiment, the unit of the azimuth power and the residual power is decibel [dB]. If the value of the residual power is larger than the azimuth power, the estimation result estimated by the azimuth estimation unit 47 is likely to be incorrect.

When the azimuth power and the residual power satisfy the following formula (11), the determination unit 483 determines that the result of the azimuth estimation of the arriving wave is correct. Meanwhile, when the azimuth power and the residual power satisfy the following formula (12), the determination unit 483 determines that the result of the azimuth estimation of the arriving wave is incorrect:

$$\text{Azimuth power} > \text{residual power} + \alpha \qquad (11)$$

$$\text{Azimuth power} \leq \text{residual power} + \alpha \qquad (12)$$

In the formulas (11) and (12), α is an offset value, and is appropriately set according to, for example, an experiment, a simulation, or the like. A ratio may be used instead of a difference for the comparison between the azimuth power and the residual power.

When it is determined that the arrival azimuth is correct, it can be determined that the target is in the arrival azimuth. Meanwhile, when it is determined that the arrival azimuth is incorrect, it can be determined that the target is not present in the arrival azimuth, and the detected target is a ghost. Cases where the arrival azimuth is determined to be wrong include a case where the outward path and the return path of the radio wave do not match each other, and a case where an error occurs during the azimuth estimation due to phase reflection or the like.

The radar device 1 may not derive an instantaneous value of target data for the target determined to be a ghost. The radar device 1 may determine that the target is a ghost when the arrival azimuth of the target is determined to be wrong for plural times. According to the radar device 1 according to the present embodiment, erroneous determination that a target is present at a position where the target is not originally present can be prevented, and erroneous tracking or the like can be prevented.

Plural arrival azimuths may be estimated for one peak in which the distance bin and the velocity bin are the same. For example, in FIGS. 3A and 3B, when the other vehicle 7 and the guardrail 8 approach, the distance bins and the velocity bins cannot be distinguished between an arriving wave whose outward route Ra and return route Rb match each other (see FIG. 3A) and an arriving wave whose outward route Ra and return route Rb do not match each other (see FIG. 3B), and one peak including information of plural arriving waves may be obtained. In such a case, plural arrival azimuths are estimated for one peak.

Here, a case where information on two arriving waves including a first arriving wave whose outward path and return path match each other and a second arriving wave whose outward path and return path do not match each other is mixed for one peak is considered. In this case, two azimuths are estimated by the azimuth estimation performed by the azimuth estimation unit 47. Even when two arrival azimuths are estimated for one peak, the number of the estimated reception signal vector XE(t) obtained by the formula (9) is one, and the number of the obtained residual power is one. Meanwhile, when two arrival azimuths are estimated, two azimuth powers are obtained so as to obtain complex amplitudes $s_1(t)$ and $s_2(t)$ for each arrival azimuth. Therefore, the azimuth power and the residual power can be compared with each other for each of a first arrival azimuth and a second arrival azimuth.

When comparing the first arriving wave with the second arriving wave, the first arriving wave has larger power and higher azimuth power than the second arriving wave. Since the peak includes the information on the second arriving wave in a wrong azimuth in which the target is not present in addition to the first arriving wave in a correct azimuth in which the target is present, the residual power is larger than that in a case where only the arriving wave in the correct azimuth is included in the peak.

For this reason, a result that formula (11) is satisfied in the comparison between the azimuth power and the residual power of the first arriving wave while formula (12) is satisfied in the comparison between the azimuth power and the residual power of the second arriving wave can be obtained. In this case, it can be determined that the target is present in the arrival azimuth of the first arriving wave and the target is not present in the arrival azimuth of the second arriving wave. In this way, according to the configuration of the present embodiment in which the azimuth power and the residual power are compared, the true target and the ghost whose distance bin and velocity bin are the same can be distinguished, and the possibility of erroneous detection of the target can be reduced.

Although the configuration in which the azimuth power and the residual power are compared is employed as described above, the predetermined power value to be compared with the residual power is not limited to the azimuth power. For example, the predetermined power value may be a power value derived based on a power spectrum obtained by performing Fourier transform on the reception signal. Specifically, the power value obtained from the power spectrum (FFT power) is a power value at a peak for which the residual power is obtained. In this example, the FFT power is obtained for each of the virtual antennas VRx1 to VRx6. For this reason, the FFT power to be compared with the residual power may be, for example, an average value of plural FFT powers obtained from the plural virtual antennas VRx1 to VRx6.

Although the true target and the ghost whose distance bin and velocity bin are the same for each peak cannot be distinguished from each other with the above configuration, the above configuration is useful, when such distinction is not necessary, for reducing burden of the calculation processing.

<4. Attention>

Configurations of the embodiment and modification in the disclosure are merely examples of the present invention. The configurations of the embodiment and modification may be modified as appropriate without departing from the technical idea of the present invention. Plural embodiments and modifications may be implemented in combination within a possible range.

Although the radar device 1 is configured to be an MIMO radar in the above description, this is merely an example. The present invention is also applicable to a configuration in which the radar device is not MIMO radar. That is, the radar device to which the present invention is applied may include one transmission antenna and plural reception antennas. Even in the case of such a configuration, an error in the estimated azimuth can be detected based on the residual signal, for example, when an error of the azimuth estimation caused by the phase reflection occurs.

Although the in-vehicle radar device has been described above, the present invention may be applied to an infrastructure radar device installed on a road or the like, a ship monitoring radar device, an aircraft monitoring radar device, or the like.

All or part of the functions described as being realized by execution of programs in the software may also be realized by an electrical hardware circuit. All or part of the functions described as implemented by the hardware circuit may be realized by software. The functions described as one block may be realized by cooperation of software and hardware. Each functional block is a conceptual component. The function executed by each functional block may be distributed to plural functional blocks, or the functions of plural functional blocks may be integrated into one functional block.

What is claimed is:

1. A signal processing device, comprising:
   an azimuth estimation unit configured to estimate an arrival azimuth of a radio wave based on a reception signal of a plurality of antennas;
   an estimated reception signal calculation unit configured to calculate an estimated reception signal based on an estimation result of the arrival azimuth, for comparison with the reception signal;
   a residual signal calculation unit configured to calculate a residual signal which is a difference between the reception signal and the estimated reception signal; and
   a determination unit configured to determine whether the estimation result of the arrival azimuth is correct based on the residual signal,
   wherein the determination unit determines whether the estimation result of the arrival azimuth is correct by comparing a power value calculated based on the reception signal with a residual power value calculated from the residual signal, and
   wherein the determination unit:
   determines that the estimation result of the arrival azimuth is correct when formula (1) is satisfied in the comparing between the power value and the residual power value:

$$\text{power value} > \text{residual power value} + \alpha \qquad (1),$$

where $\alpha$ is a predetermined offset value; and
   determines that the estimation result of the arrival azimuth is incorrect when formula (2) is satisfied in the comparing between the power value and the residual power value:

$$\text{power value} \leq \text{residual power value} + \alpha \qquad (2).$$

2. The signal processing device according to claim 1, wherein the power value is an azimuth power calculated based on a complex amplitude of the radio wave coming from the estimated arrival azimuth.

3. The signal processing device according to claim 2,
wherein the plurality of antennas are a plurality of virtual antennas based on a combination of a plurality of transmission antennas and a plurality of reception antennas.

4. The signal processing device according to claim 1,
wherein the power value is a power value derived based on a power spectrum obtained by performing Fourier transform on the reception signal.

5. The signal processing device according to claim 4,
wherein the plurality of antennas are a plurality of virtual antennas based on a combination of a plurality of transmission antennas and a plurality of reception antennas.

6. The signal processing device according to claim 1,
wherein the plurality of antennas are a plurality of virtual antennas based on a combination of a plurality of transmission antennas and a plurality of reception antennas.

7. A radar device, comprising:
the signal processing device according to claim 1; and
the plurality of antennas configured to acquire the reception signal.

8. A signal processing method, comprising:
estimating an arrival azimuth of a radio wave based on a reception signal of a plurality of antennas;
calculating an estimated reception signal based on an estimation result of the arrival azimuth, for comparison with the reception signal;
calculating a residual signal which is a difference between the reception signal and the estimated reception signal; and
determining whether the estimation result of the arrival azimuth is correct based on the residual signal,
wherein the determining determines whether the estimation result of the arrival azimuth is correct by comparing a power value calculated based on the reception signal with a residual power value calculated from the residual signal, and
wherein the determining:
determines that the estimation result of the arrival azimuth is correct when formula (1) is satisfied in the comparing between the power value and the residual power value:

$$\text{power value} > \text{residual power value} + \alpha \qquad (1),$$

where a is a predetermined offset value; and
determines that the estimation result of the arrival azimuth is incorrect when formula (2) is satisfied in the comparing between the power value and the residual power value:

$$\text{power value} \leq \text{residual power value} + \alpha \qquad (2).$$

* * * * *